June 4, 1968  R. D. MEIER  3,387,154
CONTROL CIRCUIT FOR ENERGIZING AND DEENERGIZING THE OPERATING
WINDINGS OF ELECTROMAGNETIC DEVICES
Filed July 21, 1965  2 Sheets-Sheet 1

INVENTOR.
ROGER D. MEIER
BY
*William H. Schmelzing*

INVENTOR.
ROGER D. MEIER
BY

United States Patent Office 3,387,154
Patented June 4, 1968

3,387,154
CONTROL CIRCUIT FOR ENERGIZING AND DE-
ENERGIZING THE OPERATING WINDINGS OF
ELECTROMAGNETIC DEVICES
Roger D. Meier, Menomonee Falls, Wis., assignor to
Square D Company, Park Ridge, Ill., a corporation
of Michigan
Filed July 21, 1965, Ser. No. 473,658
13 Claims. (Cl. 310—94)

This invention relates to electric control circuits for energizing and deenergizing the operating windings of electromagnetic devices, such as eddy-current brakes and clutches, and is more particularly concerned with a control circuit having improved means for effecting rapid discharge of the magnetic energy stored in the magnetic circuit of the device.

Eddy-current clutches and brakes are frequently used to control the operation of industrial machinery, such as large punch presses, and while the eddy-current operated devices provide advantages over the other types of motion transmitting devices, such as frictionally operated devices, one inherent disadvantage includes the difficulty of rapidly deenergizing the operating windings which have a relatively large inductance. Rapid deenergization is a requirement for the precise operation of industrial machines controlled by these eddy-current devices, particularly metal working machinery, such as punch presses and the like.

Inversion, which has been used to provide the deenergization of the windings of the eddy-current devices, in essence involves the transferring of the energy stored in the magnetic circuit back into the supply mains or power source via the same means which supply the winding with rectified alternating current. Usually inversion systems employ a transformer and a plurality of thyratrons and inversion results when the thyratrons are phased back so that the rectifying action of the thyratrons is effectively inverted and the unidirectional current from the operating winding of the eddy-current device is delivered into the supply mains as alternating current. When inversion is used, deenergization occurs quite rapidly as during the discharge of the stored energy by inversion, the voltage generated by the operating winding is maintained at a level slightly above the supply voltage.

Although the use of inversion provides a solution to the problem, in that deenergization takes place in a relatively short time, there are a number of inherent disadvantages associated therewith. For example, a rather complex control network must be used to provide the required phase shift control for the thyratrons. Further, there is always some current delivered to the inductive load by the supply during each half cycle, which increases the time required to complete the discharge of the energy in the magnetic circuit. The circuit according to the present invention overcomes the deficiencies inherent in circuits which employ inversion to discharge the energy in an inductive load in that the circuit will discharge the energy more rapidly and requires less critical control circuits than circuits which use inversion.

Accordingly, it is an object of the present invention to provide an improved control circuit for rapidly dissipating the inductive energy stored in the magnetic circuit of an electromagnetic device.

It is another object to provide an improved control circuit for rapidly dissipating the inductive energy stored in the magnetic circuit of an eddy-current or other electromagnetic device which circuit is simple, inexpensive, and does not require that the energy be returned to the supply mains.

Still another object is to provide an improved control circuit for energizing and deenergizing eddy-current or other electromagnetic device which uses resistors and controlled rectifiers to rapidly discharge the energy stored in the magnetic circuit thereof.

Still another object is to provide a control circuit for rapidly dissipating the inductive energy stored in the magnetic circuit of an eddy-current or other electromagnetic device wherein such dissipation takes place through a closed circuit including a discharge resistor, at a voltage level slightly less than the supply voltage in one form of my invention and in another form of my invention at a voltage level greater than the supply voltage.

Other objects and advantages will become apparent from the following specification and the drawing, in which:

FIG. 1 is a schematic wiring diagram of a control circuit for energizing and deenergizing the operating winding of an eddy-current or other electromagnetic device and embodying the present invention.

FIGS. 2, 3, and 4 depict graphical theoretical waveforms which are useful in understanding the operation of the circuit shown in FIG. 1.

In practicing the invention, a control circuit is provided for controlling the energization of the winding of an eddy-current or other electromagnetic device, such as a clutch or brake, which includes a first pair of controlled rectifiers, preferably silicon controlled rectifiers, interconnected to provide full wave rectification whereby the operating winding of the device is energized by rectified current. The invention also contemplates means in the form of circuitry and components to effect dissipation of the inductive energy stored in the magnetic circuit of the electromagnetic device in a relatively short time to permit optimum control thereof. The additional circuitry comprises a discharge resistor and a diode connected in series with each other across the winding. A voltage is impressed across the discharge resistor by a separate full wave rectifier comprising a second pair of silicon controlled rectifiers.

When the winding is to be deenergized, the first pair of rectifiers must be switched to a nonconductive state so that the energy stored in the inductance will appear as current which is forced to circulate through the discharge resistor by a voltage which rises to a value sufficient to cause current to flow through the resistor until the energy of the winding is dissipated. If the second pair of rectifiers is omitted, the energy will be dissipated in a manner commonly used if extremely fast discharge is not necessary and the voltage and current will decay exponentially in a time determined by the inductance and circuit resistance. Since the energy dissipated is proportional to the product of voltage, current and time, the dissipation can be effected in a much shorter time if the voltage across the discharge resistor is not permitted to decrease with time. Thus when the voltage across the resistor is maintained at some predetermined level, the inductance is required to generate a voltage equal to the resistor voltage in order to maintain current flow in the discharge circuit.

Figure 1:
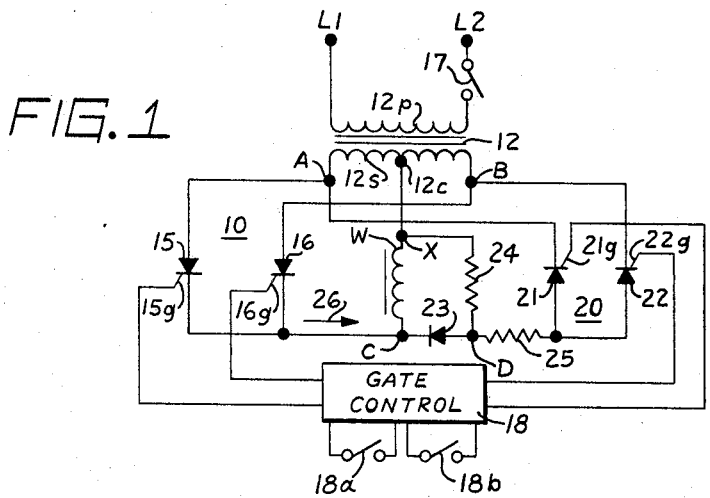

Referring now to FIG. 1, one form of the present invention comprises a full-wave rectifying circuit 10 for energizing an operating winding W of an electromagnetic device, not shown, such as an eddy-current brake or clutch. The circuit 10 includes a transformer 12, having a primary winding 12p and a secondary winding 12s, and a first pair of controlled rectifiers 15 and 16 which are preferably silicon controlled rectifiers. The primary 12p is connected to a source of alternating current L1–L2 through a switch 17 while the secondary 12s is connected to supply the operating winding W through the pair of rectifiers 15 and 16. The rectifiers 15 and 16 are connected to provide full wave rectification, i.e., the rectifier 15 is connected between a pair of terminals A and C while the rectifier 16 is connected between a terminal B and the terminal C with both of the rectifiers 15 and 16 poled to conduct current to the terminal C. The winding W is connected through a terminal X between the terminal C and a center tap 12c on the secondary 12s.

With the source L1–L2 supplying an alternating current, the rectifiers 15 and 16 alternately conduct during the positive and negative half cycles to supply a pulsating unidirectional current through the winding W in the direction of the arrow 26. More specifically, when the terminal A is positive, the rectifier 15 conducts and the rectifier 16 blocks. Conversely, when the terminal B is positive, the rectifier 16 conducts and the rectifier 15 blocks. Thus, in either case, the terminal C is always positive and the winding W receives only a unidirectional current.

The operation of the rectifiers 15 and 16 may be conventionally controlled in the well known manner by the application of suitably timed positive firing voltages on the respective control gates 15g and 16g of the rectifiers 15 and 16. Such firing voltages of proper magnitude, polarity and of sufficient duration to overcome the highly inductive load characteristics may be developed by an association well known gate control circuitry, indicated generally by the block 18, and applied to and removed from the respective control gates 15g and 16g upon operation of a suitable means, i.e., the closing and opening of contacts 18a, respectively.

The portion of FIG. 1 so far described is a conventional full wave rectifier circuit for supplying the winding W with direct current to operate the device, not shown, of which it is a part. At the expiration of an operating period, the delivery of firing voltage pulses to the gates 15g and 16g ceases when the contacts 18a open. The winding W, however, remains in an energized condition so long as inductive energy remains stored in its magnetic circuit and returns to a deenergized condition only when such energy is dissipated. Since the winding W now is energized, the rectifier 15 or 16 last conducting will not automatically switch to a nonconductive state unless special means are provided.

The deenergization of the winding W requires that the stored magnetic energy be dissipated as heat in the internal resistance of the winding W and such an external circuit as is available. Usually, a resistive circuit is provided for this purpose. Without more, the time required for the deenergization of the winding W sufficient to effect release of the associated electromagnetic device is relatively long because there is an ordinary exponential decrease of both current and voltage.

Figure 2:
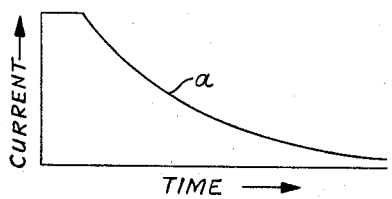

By way of illustration, the curve a in FIG. 2 shows the exponential decay of the current wave form which ordinarily occurs when discharging an inductance into a resistive load. The voltage wave form produced by the discharging inductance will be similar to the current wave form since the inductive voltage need only be as high as the IR drop across the resistance of the circuit and hence will decrease as the current decreases. This exponential decay therefor lengthens the time required to discharge the inductive energy of the operating winding W. As most industrial machinery using eddy-current clutches and brakes require that the release time must be as short as possible to permit effective control, the deenergization of the control winding W in this manner is unacceptable.

Figure 3:
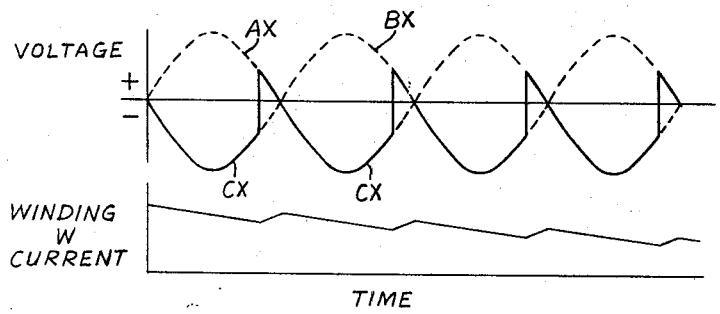

A circuit which includes the first pair of rectifiers 15 and 16 may be used to discharge the inductive energy in the winding W by means of inversion. This result is achieved by causing the rectifiers 15 and 16 to be switched to a conductive state at a late instant in each half cycle in which the anode voltages of the respective rectifiers 15 and 16 are positive relative to the cathode. It will be seen from FIG. 3 that when this method of control is employed, if the rectifier 16 was the last to conduct to supply the winding W with energizing current during a portion of the half cycle during which the anode of rectifier 16 becomes positive, the rectifier 16 will continue to conduct current discharging the inductive energy in the winding W. However, when the rectifier 15 is switched to its conductive state late during the half cycle when its anode voltage is positive, rectifier 15 will supply energy to the winding W so as to in effect reverse the direction of current flow and increase the energy stored in the inductance associated with the winding W. The switching of the rectifier 15 also causes the rectifier 16 to switch to a nonconductive state. Thus during each interval when the rectifiers 15 and 16 are alternately switched to their conductive states, the winding W will be supplied with current during an interval when it is desirable to discharge the energy thereof. Thus the time of discharge of the winding W will be increased as shown in the lower curve in FIG. 3.

FIG. 1 includes one form of a means for effecting rapid deenergization of the magnetic energy stored in the winding W. At the instant when the gate signal is removed from the rectifiers 15 and 16, current will be flowing through the winding W and one of the conducting rectifiers. Assume the rectifier 16 is conducting, and the rectifier 15 is nonconducting. When the terminal B is positive in polarity relative to the terminal X, current will flow through the transformer winding 12s and the winding W voltage in a direction making the terminal C positive relative to the terminal X. When the voltage across the winding 12s reverses, the voltage polarity across the winding W also reverses to maintain the current flow. This reversal of polarity of the winding W would normally prevent switching of the rectifier 16 to a nonconductive state.

As the rectifiers 15 and 16 will conduct as long as their anode voltage is positive in polarity relative to their cathodes in a highly inductive circuit, if the gate signals are removed from the rectifiers, the last conducting rectifier will continue to conduct as the energy stored in the inductance will not permit the rectifiers to switch to a nonconductive state. As it is required that the rectifiers 15 and 16 be switched to a nonconductive state to discharge the inductive energy in the winding W, the presence of the resistor 24, while serving the primary purpose of discharging the inductive energy in the winding W, also causes the rectifiers 15 and 16 to switch to their nonconductive states. The presence of the resistor 24 in the circuit limits the rise in positive potential at the terminal X. Thus when the voltage at terminal X rises to a value sufficient to satisfy the IR requirements of the resistor 24, all of the current through winding W will flow from terminal X through the resistor 24 and a diode 23 to the junction C, maintaining the terminal X potential less than the value of the maximum voltage supplied the transformer winding 12s between terminals A–X and B–X. Thus during each half cycle one of the rectifiers 15 and 16 will have a momentary positive cathode to anode voltage so which ever rectifier had been conducting will switch to a nonconductive state.

The circuit shown in FIG. 1 includes a means for maintaining the voltage across the discharge resistor at a magnitude slightly less than the maximum energizing voltage which is supplied by the rectifiers 15 and 16 to the winding W during the interval when the rectifiers 15 and 16 are switched to their nonconductive states. The means for maintaining the voltage across the resistor 24 includes a resistor 25, the diode 23, and a second full wave rectifying circuit 20, comprising a second pair of control rectifiers 21 and 22 which are preferably silicon controlled rectifiers. The rectifiers 21 and 22 are connected to provide full wave rectified direct current across the resistor 24 and are poled in the direction so that the terminal X has a positive polarity relative to a terminal D by having their cathodes respectively connected to the terminals A and B and their anodes connected through the resistor 25 to the terminal D. The terminal D is connected through the diode 23 to the terminal C and through the resistor 24 to the terminal X. The diode 23 is poled to conduct current from the terminal D to the terminal C and block current flow in the reverse direction. The rectifiers 21 and 22 are conventionally controlled in the well known manner by the application of suitably timed positive firing voltages on their respective gates 21g and 22g. The positive firing voltages to the gates 21g and 22g are provided by the control gate circuitry indicated by the block 18 upon the operation of a suitable means, i.e., the closing of the contacts 18b.

In the circuit shown in FIG. 1, the rectifying circuit 20 may be arranged to either continuously supply a potential across the resistor 24 or be switched to a conductive state upon the discontinuance of energizing current to the winding W.

Figure 4:
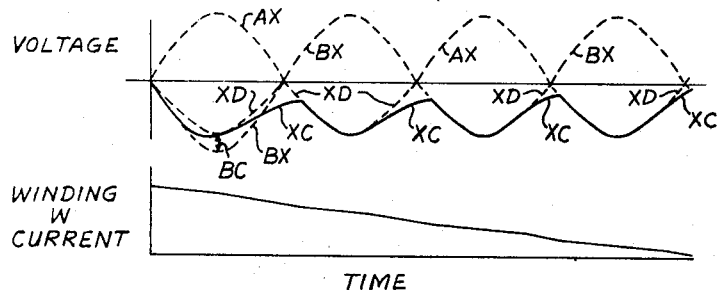

In the preferred form of my invention, suitable gate signals are applied to the second pair of rectifiers 21 and 22 concurrently with the removal of the gate signals to the first pair of rectifiers 15 and 16 so that the second pair of rectifiers 21 and 22 will conduct and supply a full wave rectified maximum voltage across resistor 24 between the terminals X–D of a value somewhat less than the maximum voltage supplied by the winding 12s because of the voltage drop appearing across the resistor 25. The negative voltage which is generated by the winding W when the polarity of the winding 12s reverses polarity forces current to flow through the resistor 24 from the terminal X to the terminal C and the diode 23. The resistors 24 and 25 are selected so the current flow through the winding W and the resistor 24 provides a maximum voltage between the terminals XD which is somewhat less than the peak voltage supplied by the winding 12s between the terminals AX and BX as shown by the curves XD, BX and AX in FIG. 4. Thus when the voltage between terminals XD reaches its maximum value, the voltage supplied by the winding W need not increase further since it is sufficient to force the necessary current through the resistor 24. After the voltage XD reaches its maximum value, voltage supplied by the winding 12s between terminals BX continues to increase causing the anode of rectifier 16 to become negative with respect to the cathode by an amount indicated as BC in FIG. 4. The rectifier 16 thus switches to a nonconductive state and the entire current supplied by the winding W flows through resistor 24. However, for current to flow from the winding W through resistor 24, the winding W must generate a voltage which is at all times equal to or greater than the voltage appearing across resistor 24. Since this voltage is a fixed amplitude, full wave rectified sine wave which is supplied by the conducting rectifiers 21 and 22, the voltage between the terminals X and C will be maintained during the discharge of inductive energy from the winding W. Also, as the voltage supplied by the winding W can never be less than the product of current and the resistance value of the resistor 24, when the voltage supplied by the rectifiers 21 and 22 from the winding 12s decreases to zero at the end of every half cycle, the voltage supplied by winding W will not become zero until the energy stored in the inductance of the winding W has been dissipated and the discharge current has decayed to zero. The above action is shown by the lower curve in FIG. 4. The diode 23 which is included in the circuit prevents the winding W from being energized in the opposite direction by the second pair of rectifiers 21 and 22 and prevents current flow from the first pair of rectifiers 15 and 16, through the rectifiers 21 and 22, in the event that both pairs of rectifiers are turned on simultaneously.

The above description pertains to one particular form of a voltage source for maintaining a voltage across the discharge resistor 24, during the period of discharge of the inductive energy stored in the winding W. Other forms may be used providing a period of time exists during which the anode to cathode voltage of the last rectifier conducting energizing current to the winding W is negative so that the last conducting rectifier may recover its blocking ability. Also, the voltage supplied by the rectifying means 20 cannot exceed the rated blocking voltage of the rectifiers in supply 10 which will cause the rectifiers 15 and 16 to switch to a conductive state and thereby increase the time required to deenergize the winding W.

Figure 5:
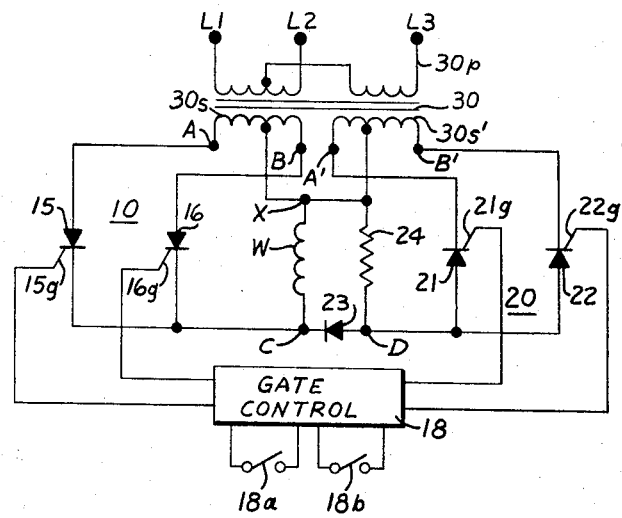
FIGS. 5 and 6 show modifications of the circuit in FIG. 1.
Figure 6:
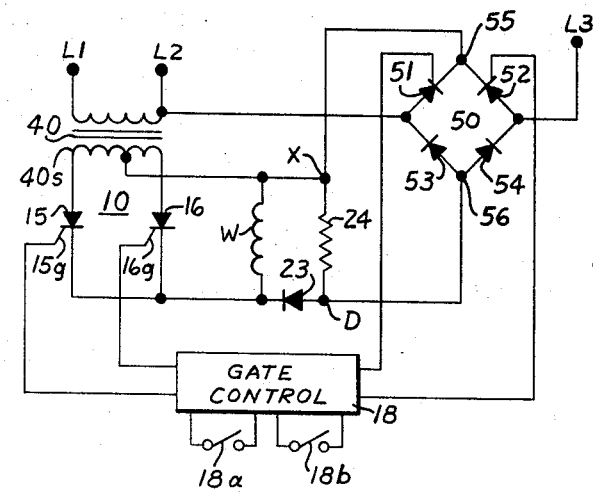

FIGS. 5 and 6 illustrate an arrangement for maintaining the voltage across the resistor 24 at a level higher than the voltage which was impressed to energize the coil winding W. Basically, the circuit shown in FIG. 5 is substantially the same as the circuit shown in FIG. 1 with the exception that the rectifiers 15, 16, 21 and 22 in FIG. 5 are connected in circuit with the secondary windings of a Scott connected transformer 30 and the resistor 25 is eliminated. In FIG. 5, the Scott connected transformer 30 has a pair of primary windings 30p connected to the terminals L1, L2, and L3 of a suitable three phase alternating current supply. The transformer 30 has a pair of secondary windings 30s and 30s' with the secondary winding 30s' having a number of turns greater than the number of turns of the secondary winding 30s so that the voltage appearing at a pair of terminals A'–B' of the winding 30s is greater than the voltage appearing at a pair of terminals A–B of the secondary winding 30s. The terminals A and B of the secondary winding 30s are respectively connected to the anodes of the rectifiers 15 and 16. The cathodes of the rectifiers 21 and 22 are respectively connected to the terminals A' and B' of the secondary winding 30s. Each of the secondary windings 30s and 30s' have a center tap connected to the terminal X. In all other respects, the components shown in FIG. 5 are identical and connected in similar fashion to the components shown in FIG. 1 and therefore are similarly designated.

Figure 7:
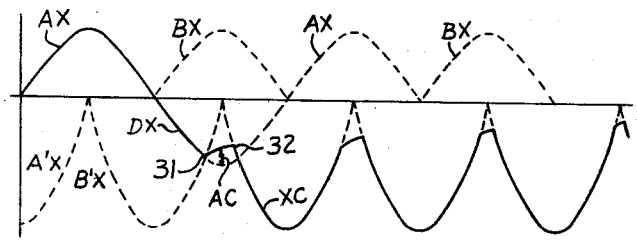
FIG. 7 depicts a theoretical waveform which is useful in understanding the operation of the circuits shown FIGS. 5 and 6.

The operation of the circuit shown in FIG. 5 will be most readily understood, reference being had to the curves in FIG. 7, wherein the curves AX, BX, A'X and B'X represent the voltages appearing between the corresponding terminals in FIG. 5. It will be seen that the voltage wave AX' lags the voltage AX by 90° which is characteristic of the output voltages of a Scott connected transformer. At the conclusion of the energizing cycle for the winding W, one of the rectifiers 15 or 16 will be conducting. If it is assumed that the rectifier 15 is conducting during the concluding energizing half cycle for the winding W, when the supply voltage AX reverses so the voltage at the terminal A becomes negative relative to the terminal X, the voltage across the winding W will reverse and the rectifier 15 will continue to conduct during the portion of the curve indicated by the voltage DX. However, during this interval the voltage at BX between the terminals is decreasing towards zero so that as the voltage output of the winding W increases to a value indicated by a numeral 31, which is sufficient to satisfy the IR requirements of the resistor 24, the cathode to anode voltage of the rectifier 15 will reverse, making the cathode of the rectifier positive relative to the anode of the rectifier 15, and the rectifier 15 will switch to a nonconductive state. The positive cathode to anode voltage of the rectifier 15 is indicated as AC on the curve in FIG. 7. Subsequent to the switching of the rectifier 15 to a nonconductive state and prior to a rise in voltage to a value indicated by the numeral 32, which voltage rise is caused by the conducting rectifier 21, the voltage output of the winding W will discharge exponentially. When the voltage across the resistor 24 increases above the value indicated by the numeral 32 on the curve XC the voltage of the winding W will similarly increase. It will be noted that the curve XC has a greater magnitude than the curve AX which causes the inductive energy in the winding W to decrease more rapidly when the circuit in FIG. 5 is used than when the circuit in FIG. 1 is employed. Further, it will be seen that as the voltage passes through zero during each of the successive half cycles when the rectifiers 21 and 22 conduct, the winding W will discharge its energy exponentially with a gradually decreasing rate, as shown in FIG. 7.

Another form of a circuit which may be employed is shown in FIG. 6, wherein one phase of a three phase alternating current supply, connected to a pair of terminals L1 and L2, is arranged to supply current through a secondary winding 40s of a transformer 40 to the rectifiers 15 and 16 while a rectifier bridge 50 which has its inputs connected to the terminals L2 and L3 of another phase of the alternating current supply is arranged to supply direct current voltage across the resistor 24. Preferably the transformer 40 is arranged so the output voltage of the rectifier 50 is greater than the voltage output supplied by the output winding 40s of the transformer 40. The direct current bridge includes a pair of silicon controlled rectifiers 51 and 52 which have their gate windings controlled by the gate control 18 in a manner similar to that employed in FIG. 1. The bridge 50 also includes a pair of diodes 53 and 54 which are poled so a direct current is supplied to a pair of output terminals 55 and 56 of the rectifier 50. The output terminals 55 and 56 are respectively connected to the terminal X and the terminal D to impress a direct current voltage across the resistor 24. It will be apparent the phase of the voltage between L2 and L3 will lag the voltage between the terminals L1 and L2 by 60° because of the characteristics of the three phase alternating current supply which is connected to the terminals L1, L2, and L3. Thus the last conducting rectifier 15 or 16 supplying energizing current to the winding W will be switched to a nonconductive state prior to the rise in the direct current voltage across the terminals X and D which is supplied by the rectifier 50 in the same manner as the voltages operated at 90° to cause the rectifiers 15 and 16 to switch to a nonconductive state in the circuit shown in FIG. 5.

It will be observed that the resistor 25, included in the circuit shown in FIG. 1, has been eliminated in the circuits illustrated in FIGS. 5 and 6. The resistor 25 when included in the circuit in FIG. 1, limits the voltage applied across the resistor 24 by the rectifier supply 20 to a value less than the maximum output voltage of the transformer secondary winding 12s during the interval required to switch the last conducting rectifiers 15 or 16 to a nonconductive state. In FIG. 1, if the switching to a conductive state of the rectifier supply 20 by the gate control 18 is delayed one or more half cycles after the rectifiers 15 or 16 are switched to a nonconductive state, the resistor 25 could be eliminated. Further, if desired, the resistor 25 may be replaced by an inductor, not shown, which will delay the increase in voltage between the terminals D and X when the rectifier 20 is initially switched to a conductive state to permit the rectifier 10 to switch to a nonconductive state as previously described. Thus after the rectifier 10 is switched to an nonconductive state, the voltage across the resistor 24 supplied by the rectifier 20 may be maintained at a value equal or greater than the voltage supplied by the rectifier 10. In FIGS. 5 and 6 the resistor 25 is not required in the circuit to limit the voltage across the resistor 24 during the intervals when the rectifiers 15 and 16 are switched to their nonconductive state. The omission of the resistor 25 in the circuits is permitted because the voltages supplied by the secondary winding 30s and the rectifier 50 in FIGS. 5 and 6 respectively, are approaching zero during the turn-off intervals of the conducting rectifiers 15 or 16.

In view of the foregoing, it is apparent that, if desired, instead of employing a Scott connected transformer, as in FIG. 5, a suitable conventional three phase transformer employing separate pairs of primary and secondary windings may be used when the primary windings are energized from the three phase supply by currents which are out of phase with each other. Further, if desired, a filtering circuit may be employed in each of the circuits in FIGS. 5 or 6 to maintain the voltage across the resistor 24 substantially constant during the discharge of the winding W.

While certain preferred embodiment of the invention have been specifically disclosed, it is understood that the invention is not limited thereto, as many variations will be readily apparent to those skilled in the art and the invention is to be given its broadest possible interpretation within the terms of the following claims.

What is claimed is:

1. A control circuit for repeatedly energizing and de-energizing the operating winding of an electromagnetic device, said control circuit comprising means for selectively applying a unidirectional energizing voltage to the operating winding and for discontinuing said energizing voltage, and means for rapidly discharging the inductive energy stored in the operating winding upon the discontinuance of said energizing voltage, said discharging means including a discharge resistor, a diode, means for connecting said resistor and diode in series with each other across the operating winding, and circuit means for maintaining a unidirectional voltage of predetermined magnitude across said discharge resistor during the discharge period.

2. A control circuit for repeatedly energizing and de-energizing the operating winding of an electromagnetic device, said control circuit comprising means for selectively applying a unidirectional energizing voltage to the operating winding and for discontinuing said energizing voltage, and means for rapidly discharging the inductive energy stored in the operating winding upon the discontinuance of said energizing voltage, said discharging means including a discharge resistor, a diode, means for connecting said resistor and diode in series with each other across the operating winding, and circuit means for maintaining a unidirectional voltage across said discharge resistor at a magnitude slightly less than said energizing voltage during the discharge period.

3. A control circuit for repeatedly energizing and de-energizing the operating winding of an electromagnetic device, said control circuit comprising means for selectively applying a unidirectional energizing voltage to the operating winding and for discontinuing said energizing voltage, and means for rapidly discharging the inductive energy stored in the operating winding upon the discontinuance of said energizing voltage, said discharging means including a discharge resistor, a diode, means for connecting said resistor and diode in series with each other across the operating winding, and circuit means for maintaining a unidirectional voltage across said discharge resistor at a magnitude slightly greater than said energizing voltage during the discharge period.

4. A control circuit for repeatedly energizing and de-energizing the operating winding of an electromagnetic device, said control circuit comprising a source of alternating current, electrical means including first rectifier means for selectively energizing the operating winding from said source with rectified current at a first voltage level and for discontinuing said energization of the operating winding, and circuit means for rapidly dissipating the inductive energy stored in the operating winding upon the discontinuance of said energization, said circuit means including a discharge resistor, a diode, means for connecting said diode and said resistor in series with each other across the operating winding, and a second rectifier means connected to said source for maintaining a rectified voltage across said discharge resistor at a second voltage level slightly less than said first voltage level during the time that the inductive energy in the operating winding is being dissipated.

5. A control circuit for repeatedly energizing and de-energizing the operating winding of an electromagnetic device, said control circuit comprising a multiphase source of alternating current, electrical means including first rectifier means for selectively energizing the operating winding from one of the phases of said source with rectified current at a first voltage level and for discontinuing said energization of the operating winding, and circuit means for rapidly dissipating the inductive energy stored in the operating winding upon the discontinuance of said energization, said circuit means including a discharge resistor, a diode, means for connecting said diode and said resistor in series with each other across the operating winding, and second rectifier means connected to another of the phases of said source for maintaining a rectified voltage across said discharge resistor at a second voltage level greater than said first voltage level during the time that the inductive energy in the operating winding is being dissipated.

6. A control circuit for repeatedly energizing and deenergizing the operating winding of an electromagnetic device, said control circuit comprising a source of alternating current, electrical means including first rectifier means for selectively energizing the operating winding from said source with rectified current at a first voltage level and for discontinuing said energization of the operating winding, and circuit means for rapidly dissipating the inductive energy stored in the operating winding upon the discontinuance of said energization, said circuit means including a discharge resistor, a diode, means for connecting said diode and said resistor in series with each other across the operating winding, and second rectifier means connected to said source for supplying a rectified voltage across said discharge resistor a predetermined instant after discontinuing said energization and for maintaining the rectified voltage across the resistor at a second voltage level greater than said first voltage level during the time that the inductive energy in the operating winding is being dissipated.

7. A control circuit for repeatedly energizing and deenergizing the operating winding of an electromagnetic device, said control circuit comprising a source of alternating current, electrical means including first rectifier means selectively operative to energize the operating winding from said source with rectified current at a given voltage and to discontinue said energization of the operating winding, and circuit means for rapidly dissipating the inductive energy stored in the operating winding upon the discontinuance of said energization, said circuit means including a discharge resistor, a diode, means for connecting said discharge resistor and said diode in series with each other across the operating winding, a second rectifier means, and a voltage dropping resistor, said second rectifier means being connected to supply a rectified voltage from said source across said discharge resistor, and said dropping resistor being interposed in series with said second rectifier means so that said voltage supplied by said second rectifier means across said discharge resistor is less than said energizing voltage applied to the operating winding from said first rectifier means.

8. A control circuit for repeatedly energizing and deenergizing the operating winding of an electromagnetic device, said circuit comprising a supply transformer having a primary winding and a center-tapped secondary winding, a source of alternating current, a first pair of controlled rectifiers, said primary winding being connected to said alternating current source and said secondary winding being connected to said operating winding through said first pair of controlled rectifiers, said first pair of controlled rectifiers being poled to pass a unidirectional current through said operating winding, and circuit means for rapidly dissipating the inductive energy of the operating winding including a discharge resistor and a diode connected in series with each other across the operating winding, voltage dropping means, and a second pair of controlled rectifiers, said second pair of controlled rectifiers and said voltage dropping means being operatively connected to maintain a rectified voltage of predetermined magnitude across said discharge resistor.

9. In a control system for an electrically driven machine intermittently operated by an electromagnetic control device having an inductive operating winding, circuit means for repeatedly energizing and deenergizing the operating winding, said circuit means comprising a source of alternating current, first controlled rectifier means connected to supply, when conductive, a first rectified voltage to the operating winding from said source, a discharge resistor, a diode, means connecting said resistor and said diode in series with each other across the operating winding, and second controlled rectifier means connected to supply, when conductive, a second rectified voltage to said discharge resistor from said source, said second rectified voltage being less in magnitude than the magnitude of said first rectified voltage, and control means for selectively rendering said first and second rectifier means conductive.

10. A control circuit for repeatedly energizing and deenergizing the operating winding of an electromagnetic device, said control circuit comprising a source providing an alternating current of two different phases, electrical means including first rectifier means selectively operative to energize the operating winding from one of the two phases of the source with rectified current at a given voltage and to discontinue said energization of the operating winding, and circuit means for rapidly dissipating the inductive energy stored in the operating winding upon the discontinuance of said energization, said circuit means including a discharge resistor, a diode, means for connecting said discharge resistor and said diode in series with each other across the operating winding, and a second rectifier means, said second rectifier means being connected to supply a rectified voltage between a second of the two phases of the source across said discharge resistor so that said voltage supplied by said second rectifier means across said discharge resistor is greater than said energizing voltage applied to the operating winding from said first rectifier means.

11. A control circuit for repeatedly energizing and deenergizing an operating winding of an electromagnetic device, said circuit comprising: a polyphase alternating current source, a Scott-connected transformer having a primary winding connected across the phases of the source and a pair of secondary windings one of which is arranged to provide a lower output voltage than the other secondary winding, means including a first pair of controlled rectifiers for selectively energizing the operating winding with rectified current having one polarity from said one secondary winding and for discontinuing said energization, and circuit means for rapidly dissipating the inductive energy stored in the operating winding upon discontinuance of said energization, said circuit means including a discharge resistor, a diode, means connecting the diode and said resistor in series with each other and the operating winding in a direction across the operating winding for preventing energizing current for the operating winding from flowing through the resistor, and means including a second pair of controlled rectifiers connected to the said other secondary winding for supplying a rectified voltage across the operating winding and the resistor having a polarity opposite said one polarity a predetermined instant subsequent to the discontinuance of the energization of the operating winding by the first pair of rectifiers and for maintaining the opposite polarity voltage at a level greater than the level of the energizing voltage during the period the inductive energy in the operating winding is being dissipated by the resistor.

12. A control circuit for repeatedly energizing and deenergizing an operating winding of an electromagnetic device, said circuit comprising: a polyphase alternating current source, a transformer having a pair of primary windings connected across the phases of the source and a pair of secondary windings one of which is arranged to provide an output voltage and leading in phase and lower in magnitude than the output voltage of the other secondary winding, means including a first pair of controlled rectifiers for selectively energizing the operating winding with rectified current having one polarity from said one secondary winding and for discontinuing said energization, and circuit means for rapidly dissipating the inductive energy stored in the operating winding upon discontinuance of said energization, said circuit means including a discharge resistor, a diode, means connecting the diode and said resistor in series with each other and with the operating winding in a direction for preventing energizing current for the operating winding from flowing through the resistor, and means including a second pair of controlled rectifiers connected to the said other secondary winding for supplying a rectified voltage having a polarity opposite the said one polarity across the operating winding and the resistor a predetermined instant subsequent to the discontinuance of the energization of the operating winding by the first pair of rectifiers and for maintaining the opposite polarity voltage at a level greater than the level of the energizing voltage during the period the inductive energy in the operating winding is being dissipated by the resistor.

13. A control circuit for repeatedly energizing and deenergizing an operating winding of an electromagnetic device, said circuit comprising: a polyphase alternating current source, a transformer having a primary winding connected across one of the phases of the source and a secondary winding arranged to provide an output voltage having a predetermined magnitude, means including a first pair of controlled rectifiers for selectively energizing the operating winding with rectified current having one polarity from said secondary winding and for discontinuing said energization, and circuit means for rapidly dissipating the inductive energy stored in the operating winding upon discontinuance of said energization, said circuit means including a discharge resistor, a diode, means connecting the diode and said resistor in series with each other and with the operating winding in a direction for preventing energizing current for the operating winding from flowing through the resistor, and means including a second pair of controlled rectifiers connected in a full wave bridge circuit to another phase of the source for supplying a rectified voltage across the operating winding and the resistor having a polarity opposite said one polarity a predetermined instant subsequent to the discontinuance of the energization of the operating winding by the first pair of rectifiers and for maintaining the opposite polarity voltage at a level greater than the level of the energizing voltage during the period the inductive energy in the operating winding is being dissipated by the resistor.

No references cited.

ORIS L. RADER, *Primary Examiner.*

J. J. BAKER, *Assistant Examiner.*